March 3, 1959
H. HENKEL ET AL
2,875,900
APPARATUS FOR THE REMOVAL OF WATER AND
FOREIGN BODIES FROM FLUIDS
Filed Aug. 3, 1954
3 Sheets-Sheet 1
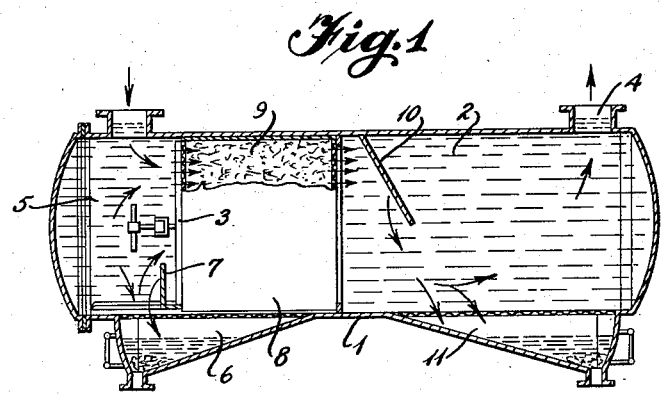
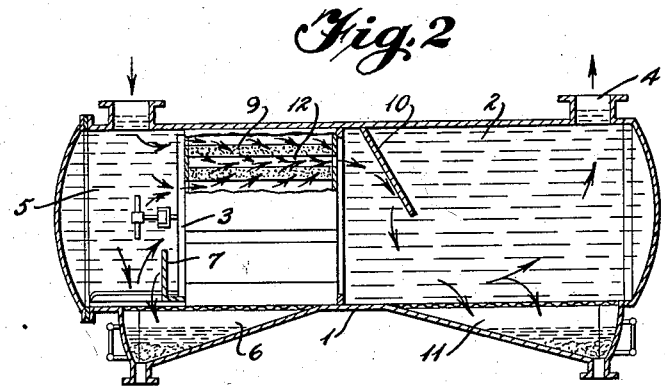
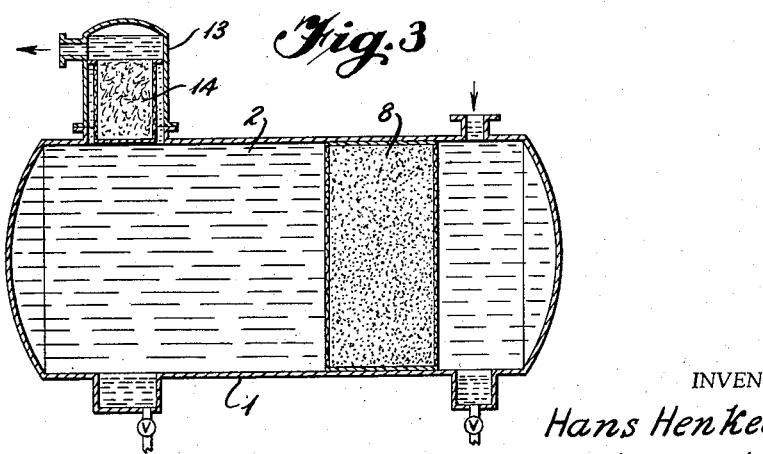
INVENTORS
Hans Henkel and
Heinz Achtznick
BY
ATTORNEYS

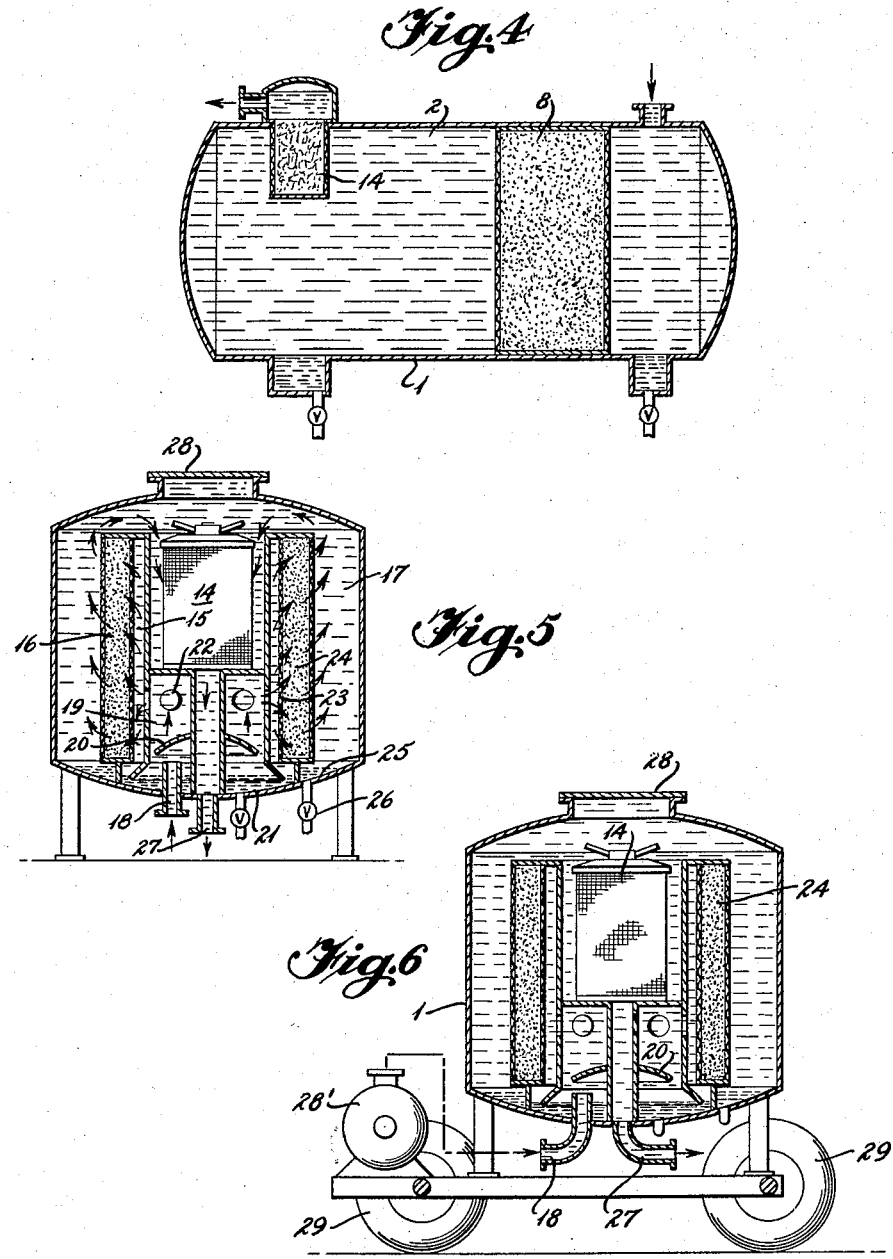

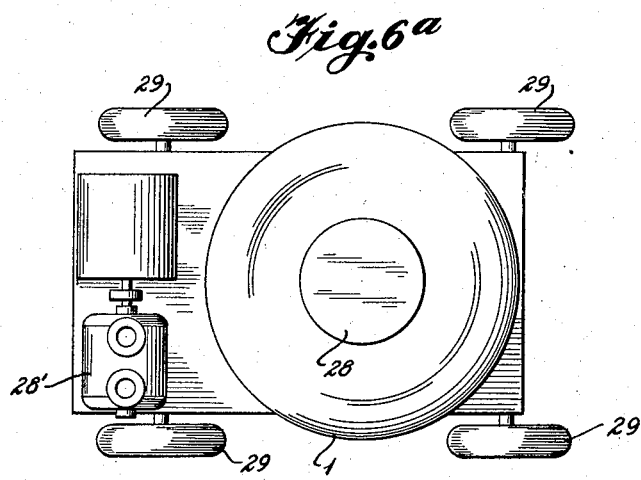
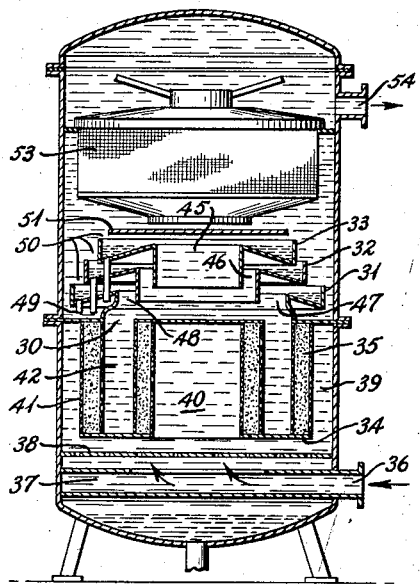
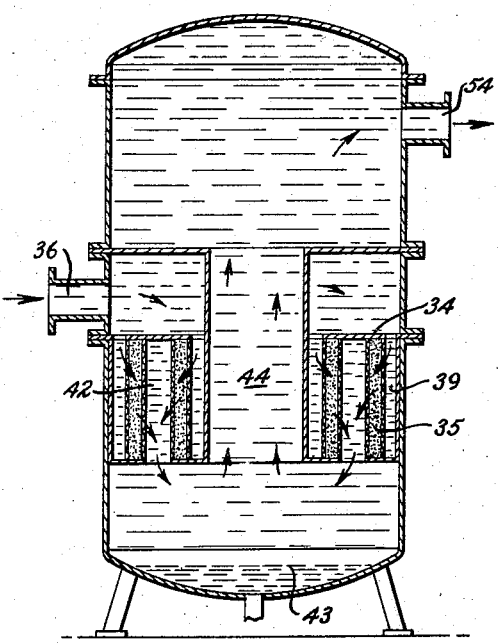

United States Patent Office 2,875,900
Patented Mar. 3, 1959

2,875,900

APPARATUS FOR THE REMOVAL OF WATER AND FOREIGN BODIES FROM FLUIDS

Hans Henkel and Heinz Achtznick, Oberursel, Germany

Application August 3, 1954, Serial No. 447,578

Claims priority, application Germany August 4, 1953

3 Claims. (Cl. 210—301)

The invention relates to an apparatus for removing water from and for cleaning fluids. A really complete water separation is of ever increasing importance, particularly in the filtering of fuels for civil and military aviation. At the same time the solution of this problem becomes ever more difficult because today, for example during the refuelling of aircraft, flow rates of more than a thousand litres per minute are required, for which centrifugal pumps with high rotational speeds are largely used.

The constant increase in suction lift resulting from the changeover to cover larger storage tanks, combined with the increased installation of additional apparatus, has raised the resistance in the suction pipeline beyond the permissible limit so that the separator equipment can now only be installed downstream of the centrifugal pump that is to say in the delivery line. But since even this arrangement does not always overcome the difficulties which arise, there has recently been an increasing tendency to introduce plunger pumps, with which the otherwise inevitable suction of the fuel is avoided, even over the shortest distance.

Such a use of plunger or centrifugal pumps, however, results in the fact that, as a result of the rapid revolution of the wheel or impeller of the pump, the fuel to be cleaned is mixed into a pseudo emulsion with the water contained therein before reaching the filter, and this emulsion can only be broken down with difficulty. But such a separation involves special difficulties if it is a question of fuel intended for jet propulsion such as kerosene.

Herein lies the true cause of the failures which have occurred hitherto in the cleaning of such petroleum derivatives and mixtures. In order to be certain of removing every admixture of water from these fuels, the most varied filters, and equipment including every conceivable device, have been developed; water separators have been built with gigantic stilling chambers and even chemical means have been introduced.

As a rule, however, none of these devices continue to work perfectly if kerosene, for example, is to be cleaned instead of aviation spirit, and they largely fail as soon as they are installed not upstream but downstream of the centrifugal pump. Their use founders on the fact that although it is true that even in this case the free water content left in the fuel can be separated, because of its higher specific weight, by means of centrifugal separators, impingement devices, stilling chambers, and by other means, nevertheless that fraction of the water which has formed a pseudo-emulsion with a corresponding quantity of fuel under the action of the rapidly rotating centrifugal pump, passes, in this form, through all the filters and water separators hitherto known, without being held back by them to an adequate extent. This drawback, which can be very dangerous, particularly for jet engines, is overcome by the present invention.

According to the invention there is installed upstream of a stilling chamber a container having a charge of vegetable fibre, e. g., cotton linters, which breaks down the emulsion by mechanical means, and then means are provided for removing the water. The vegetable fibre used to fill the container, particularly cotton linters, has considerably more favourable properties than impregnated wood-wool, which was used hitherto. A breaking down of the emulsion-like mixture takes place even if a great deal of water reaches the charge, because the fibre does not so much absorb as separate the water, even when the latter is present in the most finely-divided form.

In addition, the material also has the advantage that not only large cylindrical chambers can be filled with it but also several narrow hollow cylinders, for example, which—arranged in parallel—offer a considerably increased, and hence more effective, surface for the same amount of space taken up.

According to the invention, therefore, a device is preferably used in which the charge intended for breaking down the emulsion is distributed over one or more tubular, fan-shaped or other hollow bodies, so that a greater surface area is offered to the emulsion and the rate of flow is reduced.

It is advisable to provide a device upstream of the emulsion-breaking container, in which the free water can be separated in advance.

The efficiency of the equipment can be further increased if, before finally leaving the apparatus, the fluid is also subjected to a micro-filtration, by means of which even the slightest traces of water, and moreover the finest impurities, are held back by solid substances.

Downstream of the container provided for the breaking down of the emulsion, individual chambers are preferably arranged, to which the demulsified fluid is conveyed in precisely determined amounts through a suitably constructed system of pipe-lines, so that, at a reduced rate of flow, all the water which has not previously been separated out, is deposited at the bottom from whence it can be drained off as desired.

In a preferred embodiment, the stilling chamber is in the form of an upright settling tank surrounding a rounded or angular annular demulsifier in a hollow inner chamber of which the filter elements for holding back the finest traces of water and impurities are housed, while an antechamber and also a preliminary separator for the removal of water and coarser impurities may be arranged according to whether the fluid inlet is at the bottom or the top.

Further details and characteristics of the subject of the invention are disclosed in the following description of a specific embodiment given by way of example and illustrated in the accompanying drawings.

Figure 1 shows a longitudinal section through a micro-separator according to the invention;

Figure 2 shows a longitudinal section through a modified embodiment;

Figures 3 and 4 each show a diagrammatic longitudinal section through a micro-separator with filter members;

Figure 5 shows a section through a combined micro-separator;

Figures 6 and 6a show a view partly in section and in plan of a mobile embodiment;

Figures 7 and 8 each show a section through a micro-separator having an upright settling tank according to the invention.

In the micro-separator illustrated in Figure 1, the fuel, before entering the stilling chamber 2 of the water separator 1, is conveyed through a special ancillary device 3, the purpose of which is to break down the pseudo-emulsion produced by the rotary pump into its original constituents such as kerosene and water. This is not a filter-like device which absorbs the water and thus removes it from the fluid flowing through, but a mechanically-acting demulsifier, which separates the fuel and water from each other. The fluid is thus restored to the condition in which it was before its two main constituents were converted into an emulsion by the centrifugal pump, and it can now pass through the stilling chamber 2 with the same result as it would have done if the water separator had been installed on the suction side. The fluid, freed from water, leaves the stilling chamber through the outlet 4.

In order to remove as much as possible of the free water contained in the fuel before its passage through the demulsifier, a settling tank 5, which ends in a water trap 6 at the bottom, may conveniently be arranged upstream of the demulsifier. This preliminary separation can be further increased by installing a baffle 7. A baffle 10 and a water-trap 11 are also provided in the chamber 2.

The ancillary device 3 for breaking down the emulsion consists primarily of a container 8 having a charge 9 of suitable material causing the separation of the fluid, e. g. cotton linters.

Since the effect of such substances leading to the breaking down of the emulsion decreases with an increased rate of flow, and ceases entirely beyond a given limit, it is a further basic feature of the present invention to slow down the rate of flow of the fluid by a widening of the cross-sectional area in the ancillary device 3. In this manner the appearing resistance is kept as small as possible. The container of the ancillary device may, for example, be given a fan-shaped form or may be sub-divided into several star-shaped bodies, so as to bring about a corresponding reduction in the rate of flow of the incoming fluid as a result of the associated increase in the surface area.

The same result can be obtained by the construction shown in Figure 2 by using double-walled inserts 12, which are filled with the demulsifying material 9. As indicated by the arrows, the fluid passes through the inlet into the settling tank 5, then penetrates through the outer walls, consisting for example of wire gauze or paper, of the inserts 12 contained therein, passes through the charge 9 and finally flows into the adjacent stilling chamber 2 of the water separator 1. Here the water, because of its greater specific weight, the effect of which may, if necessary be further increased by the installation of a baffle 10, sinks to the bottom and collects in the water-trap 11 provided for this purpose, while the fuel, freed from water, leaves the container through the outlet 4.

Figure 3 shows an embodiment in which the container 2 of the apparatus carries an attachment 13, in which the filter members 14 are housed. Apart from the resulting improved separation of the water and solid impurities, this method leads to a further increase in the capacity of the whole plant because the suction effect which threatens to develop at the outlet of the container is obviated by the considerable increase in the cross-sectional area and the associated reduction in the rate of flow, so that the quantity of flow can be increased accordingly.

In the embodiment shown in Figure 4, the filter elements 14, situated upstream of the outlet, are completely let into the container to save space and material. As a result the apparatus becomes less bulky and also cheaper to produce.

In order to make a great reduction in the dimensions and weight of the whole equipment, which is of considerable importance for example in air transport, an apparatus has been produced according to the invention comprising a water separator which meets these requirements in their entirety. Instead of the horizontal container, there is here, as shown in Figure 5, an upright annular hollow body 15, which is again subdivided into the demulsifier 16 and a comparatively large settling tank 17. In the cylindrical inner chamber obtained in this manner there are housed a preliminary separator and the filter members 14 for the final micro-filtration. The cleaning process takes place in the following manner:

The fluid passes through the inlet 18 into the apparatus, and first fills the ante-chamber 19 in which an impingement device 20 may be installed as a preliminary separator for any water and coarser impurities which may be present. The water fractions which sink to the bottom under the influence of their greater specific weight, collect at the bottom 21 of the apparatus. The remaining fluid flows through the apertures 22 in the annular chamber 15. There, any free water which may still be contained in it is mostly held back by the resistance offered to its passage by the surface of the demulsifier 16.

The demulsifier 16 consists of a permeable casing 23 having a charge 24, for example of cotton linters or a prepared vegetable fibre of similar type.

In so far as any free water still present in the fluid does not flow down from the chamber upstream of the demulsifier into the collecting chamber, both it and the remaining fraction of the water contained in the fluid as a pseudo-emulsion, pass through the filler 24 in the demulsifier 16, to enter the annular settling tank 17.

Since all emulsion-like mixtures are broken down by the filler 24 into their original constituents, only free water leaves the demulsifier with the remaining fluid. This free water sinks to the bottom in the settling tank 17, collects at its bottom 25 and can be drawn off here by a cock 26. The fluid, which has been freed of water and also of coarse impurities then flows in the manner indicated by the arrows, coming from the top, through the filter members 14 which it leaves—now freed of even the finest traces of water and foreign bodies— through the outlet 27.

The upper portion of the housing may be provided with a cover 28, which is easily removable by undoing a few nuts, so that the filter members, which may be combined to form a complete unit, can be easily removed and cleaned independently of the remaining parts of the apparatus.

Equipment of the type described is intended not only for refineries, reloading depots and airport installations, but, because of its comparatively small dimensions and light weight is also primarily suitable for applications in which the means for the removal of water and the filtration of fuels, oils and similar fluids must, in certain circumstances, be transferred quickly from one place to another. Thus in military manoeuvres, for example, or in present-day mobile warfare, which embraces enormous areas, much may depend on the possibility of being able to make a particularly fast start on refuelling machines coming into action on a new airfield still under construction. But for this, equipment is needed which will not load the transport planes or lorries used to convey it, either from the point of view of bulk or of weight, beyond the extent absolutely necessary, and which can come into operation immediately on arrival at a fresh situation without further loss of time.

The apparatus is therefore further expanded in the embodiments of the invention shown in Figures 6 and 6a by the addition of a delivery pump and driving motor 28' which, together with the apparatus and a bubble separator which may be attached if necessary, form a complete refuelling plant. As can likewise be seen from the drawing, this can be mounted on easily detachable wheels 29, so as to simplify the conveyance of the entire refuelling equipment to the required position, and even to enable this to be done by a single person.

In the embodiment as shown in Figures 7 and 8, the demulsifier is housed in the lower portion of the housing and completely cancels out the undesirable effect of the centrifugal pump so that a fluid which is conveyed through the annular outlet 30 to the chambers 31, 32 and 33, no longer contains any emulsion but only free water.

The breaking down of the emulsion flowing through takes place in the demulsifier 34 by means of a prepared vegetable fibre filler 35. Since a series of experiments carried out have shown that this separating effect depends to a large extent on the rate at which the fluid enters and traverses the filler, in the embodiments of the invention shown in Figures 7 and 8, the flow of fluid is subdivided in the manner indicated above so that its rate is greatly reduced by means of a marked widening of the cross-sectional area in conjunction with a considerable increase in the surface of the filling charge.

This if it is a question of filtering, for example kerosene, JP 4 or another fuel for jet propulsion, which has gone into a pseudo-emulsion with admixtures of water in a centrifugal pump situated upstream thereof, the fuel is conveyed to the apparatus through the inlet 36 and is then conveyed to the demulsifier 34—if necessary via an impingement device acting as a premilinary separator, which may consist of an impingement tube 37 having a superposed distributor plate 38. In doing so, as can be seen by the arrows in the figures, the fuel flows simultaneously into the annular passage 39 and into the cylindrical inner chamber 40, passing from thence through the annular filler body 41, enclosed by perforated sheet metal, cloth or a similar permeable material, into the annular passage 42, which it leaves at the top.

In order to house the demulsifier in the minimum space in accordance with the practical requirements, it is not sufficient merely to subdivide it into two or more concentrically arranged filler bodies 41 in the manner described, but this must also be done by a specific method, on the use of which success decisively depends. On the one hand the sum of the cross-sections of the outer annular passage 39 (see Figure 7) and of the cylindrical inner chamber 40 must equal the cross-section of the annular outlet 42, but at the same time the fluid must enter the filler from the annular passage 39 at the same rate as it leaves the inner chamber 40, i. e. the fractions resulting from the splitting up of the flow of fluid must be in exactly the same proportion to one another as the surface of the filling body which they enter. Only when all these pre-requisites are met simultaneously is an absolutely constant rate ensured for the fluid passing through and hence a reliable breaking down of the emulsion with the minimum requirement of space.

The fluid which flows out of the annular channel 42, at the top in the embodiment shown in Figure 7, and at the bottom in that illustrated in Figure 8, is conveyed into the chamber 44 directly in the first case and via a settling tank 43 in the manner indicated by the arrows, in the second case.

The flow of fluid is split up in a precisely calculated proportion by suitable dimensioning of the cross-sectional areas of the inlets 45, 46 and 47 of the water separator 48. The subsidiary flows thus produced flow directly into the settling tanks through passages which may be formed, in the manner illustrated, from the downwards sloping bottoms of the settling tanks. Thus, in each case, the subdivision once made, is retained, and by the correct choice of the dimensions it is possible to ensure that the fractions of the fluid flow split up accordingly and entering the individual chambers, there assume equal increases in rate not exceeding a given limit.

If this requirement is met, then all the water which may still be entrained sinks as a result of its greater specific weight to the bottom of the chambers, from whence it is conveyed through pipes 49 to the open or to a collecting chamber. The fluid, on the other hand, which is now free from all admixture of water, flows through the outlets 50 in the chambers and then into a filter 53—which may conveniently be situated above—and which now holds back all remaining solid foreign matter to the fineness ensured by the filter means, and finally leaves the whole apparatus through the outlet 54.

An apparatus of smaller dimensions in correspondence with the rate of flow may be built into a jet plane, for example directly in front of the power plant, in order to remove in this manner amounts of condensed water which may be present on account of climatic conditions, large differences in attitude or for similar reasons and in order to submit the fuel to a last cleaning action.

The present invention offers the possibility of combining in a single unit water separation and filtration for which large bulky settling tanks for removing the water, a filter of corresponding size for freeing from solid foreign substances and in addition special pipe connections with the associated connections were hitherto necessary—particularly downstream of centrifugal pumps. Moreover the size of said unit scarcely exceeds that of a simple filter with the same flow capacity. In this manner, too, the shifting of airfields is greatly simplified, and made exceptionally easy, particularly when transport planes are used, by the saving of space and weight.

We claim:

1. Apparatus for the removal of water and foreign bodies from fluids comprising a housing having an inlet opening into a first annular separation chamber in the interior of said housing and an outlet opening, an annular demulsifier hydraulically connected to said separation chamber defining an outlet from said first separation chamber and an inlet to a second separation chamber located in the interior of said housing, said second separation chamber including a plurality of settling tanks having inlet means arranged to increase the flow of fluid therethrough to predetermined rates, the rate of flow of fluid through each of said settling tanks being equal.

2. Apparatus as recited in claim 1 wherein said demulsifier discharges fluid into said second separation chamber through an annular discharge opening and said inlet means of said settling tanks comprises a plurality of concentric annular members defining a plurality of annular openings facing the annular discharge opening of said demulsifier.

3. Apparatus as defined in claim 2 including filter means disposed between the outlet of said settling tanks and the outlet of said housing.

References Cited in the file of this patent

UNITED STATES PATENTS

| | | |
|---|---|---|
| 1,787,577 | Hills | Jan. 6, 1931 |
| 2,325,399 | Houston | July 27, 1943 |
| 2,412,841 | Spangler | Dec. 17, 1946 |
| 2,555,607 | Robinson | June 5, 1951 |
| 2,609,932 | Fricke | Sept. 9, 1952 |
| 2,649,964 | Taylor | Aug. 25, 1953 |